N. E. NICHOLS.
CULTIVATOR.
APPLICATION FILED JUNE 22, 1917.

1,239,945.

Patented Sept. 11, 1917.
2 SHEETS—SHEET 1.

Witnesses
Philip Serrell
Francis L. Powell

Inventor
N. E. Nichols
By D. Swift & Co.
his Attorneys

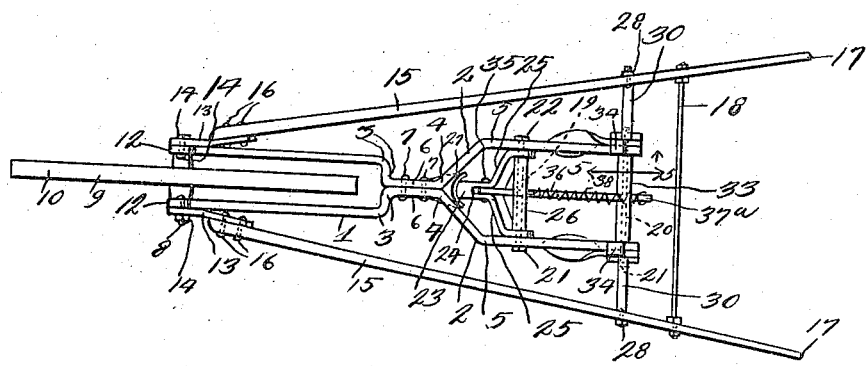
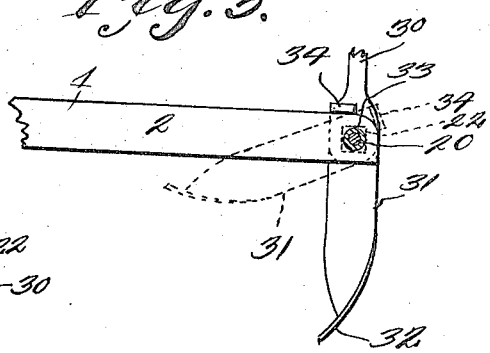
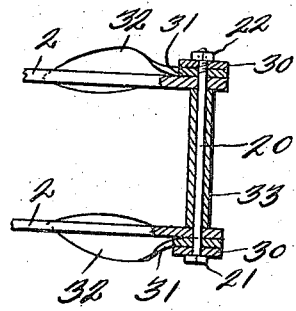

UNITED STATES PATENT OFFICE.

NOAH EVERETT NICHOLS, OF GILLETT, ARKANSAS.

CULTIVATOR.

1,239,945.  Specification of Letters Patent.  Patented Sept. 11, 1917.

Application filed June 22, 1917. Serial No. 176,368.

*To all whom it may concern:*

Be it known that I, NOAH EVERETT NICHOLS, a citizen of the United States, residing at Gillett, in the county of Arkansas and State of Arkansas, have invented a new and useful Cultivator; and I do hereby declare the following to be a full, clear, and exact description of the invention, such as will enable others skilled in the art to which it appertains to make and use the same.

This invention relates to an improved cultivator and one of the objects of the invention is to provide a durable, light, inexpensive and practical construction of cultivator, more especially adapted for cultivating the soil and crops of gardens.

A further object of the invention is to provide a suitable frame for supporting the cultivating shovels, which may be adjusted according to the work to be accomplished.

A further object of the invention is to provide a three shovel cultivator, one in front and two in the rear.

A further object of the invention is to provide means whereby any one of the shovels may be adjusted out of operative position.

A further object of the invention is the provision of a forward cultivator shovel having a rearwardly and upwardly extending brace in combination with a spring, whereby the forwardly disposed shovel may be held in operative position or out of operative position.

In practical fields, the details of construction may necessitate alterations falling within the scope of what is claimed.

The invention comprises further features and combination of parts, as hereinafter set forth, shown in the drawings and claimed.

In the drawings:—

Fig. 3 is a plan view.

Fig. 4 is a sectional view through the means for holding the rear cultivating shovels.

Fig. 5 is a sectional view on line 5—5 of Fig. 3.

Figure 1:
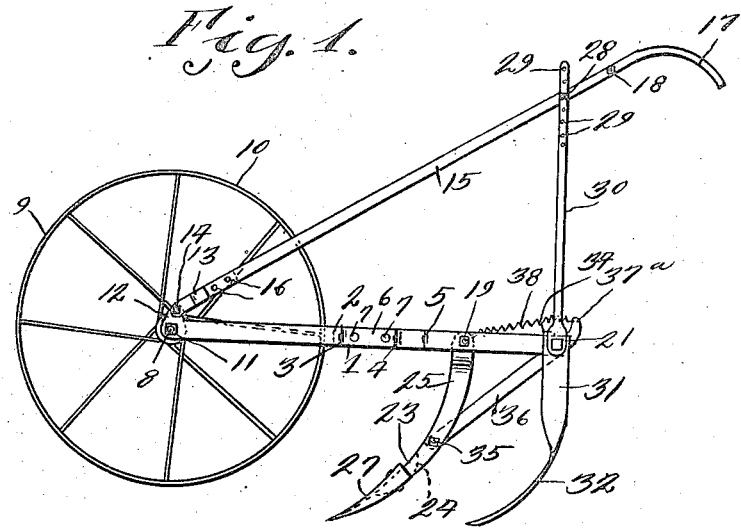
Figure 1 is a view in side elevation of the improved cultivator constructed in accordance with the invention.
Figure 2:
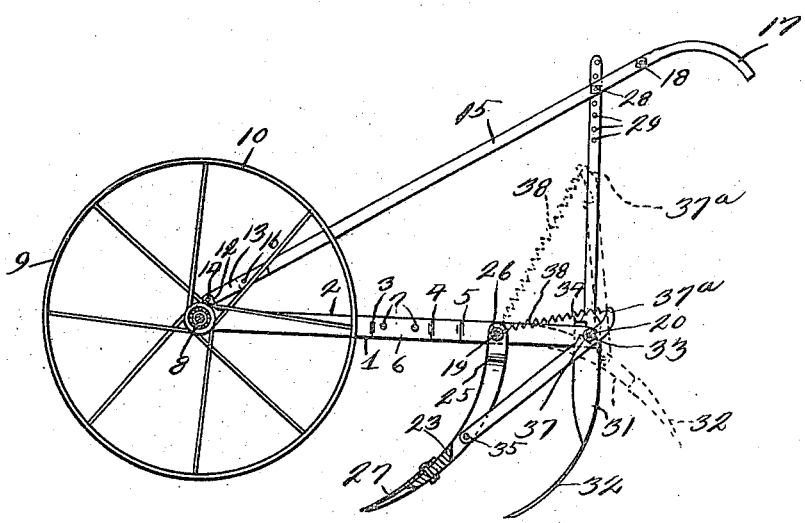
Fig. 2 is a longitudinal sectional view.

Referring more especially to the drawings, 1 designates the frame of the cultivator, which comprises the bars 2. The central portions of the bars are bent, as at 3, 4 and 5, so that the parts 6 of said bars engage each other, as shown in Fig. 3. These portions 6 are riveted or otherwise secured together, as shown at 7. The forward parts of the bars constitute forks in bearings of which an axle 8 is mounted. A suitable supporting wheel 9 having ball bearings (not shown) is journaled upon the axle 8. This supporting wheel is provided with spokes similar to bicycle wheel spokes, and a steel rim or tire 10. Suitable nuts 11 are mounted upon the ends of the axle 8 to prevent axial movement of the axle 8. Rising upwardly from the forward ends of the forks are ears 12 to which the iron straps 13 are bolted, as shown at 14. Handle beams 15 are bolted at 16 to said strap, and the upper rear ends of said beam terminate in handle 17. A suitable brace rod 18 connects the handle beams, for reinforcing them in place. The rear of the bars 2 diverge outwardly and extend rearwardly in parallelism, forming forks, there being rods 19 and 20 connecting said forks. One end of each rod 19 and 20 has a head 21 and its other end a threaded nut 22. A suitable shovel post 23 is provided. This post is bifurcated, as shown at 24, and the forks 25 of said post diverge upwardly and are apertured at their upper ends for the reception of the rod 19. Mounted upon the rod 19 and interposed between the upper ends of the forks 25 is a sleeve or tubular member 26, therefore, by tightening up on the nut 22 of said rod 19, the upper ends of the forks 25 will be clamped securely in place. A suitable cultivator shovel 27 is carried by the lower end of the post or standard. Secured to the handle beams vertically adjustable by means of the nuts and bolts 28 (the bolts thereof each being capable of extending through any one of the apertures 29) are suitable vertical braces 30, through the lower ends of which the rod 20 extends. Also mounted upon the rod 20, between the rear ends of the rear forks of the bars 2 and the lower end of said braces 30, are the upper ends of the shovel blades 31, the lower portions of which are twisted to provide the shovels 32. Mounted upon the rod 20, between the rear ends of the rear forks, is a sleeve or tubular member 33. By tightening up on the nut 22 of the rod 20, the shovel blades 31 may be clamped in different adjusted positions. The upper ends of the shovel blades have laterally inwardly extending lugs 34, which overlie the upper edges of the rear forks adjacent their ends, whereby the shovel blades are held in vertical position, as shown clearly in Figs. 1, 2. and 5. These lugs constitute form abutments, which will prevent the shovel blades from moving rearwardly when operating in and cultivating the soil. When the shovel blades 31 are moved forwardly and upwardly on their pivots, as shown in dotted lines in Fig. 5, the nut 22 of the rod 20 may be tightened, in order to hold the shovel blades in such positions. Pivoted upon a suitable pin 35 in the crotch of the bifurcation 24, is a suitable brace 36, which is provided with a notch 37 near its upper rear end, which terminates in an upwardly curved portion or hook 37$^a$. Connecting the portion 37$^a$ to the sleeve or tubular member 26 is a tension coiled spring 38, which holds the brace 36 in position, as shown in full line in Figs. 1 and 2, with the notch 37 in engagement with the sleeve or tubular member 33, thereby bracing and preventing rear movement of the shovel 27 and the standard or post 23. By moving the upper end of the brace 36 downwardly and rearwardly, and then disposing the shovel 27 and its post 23, as shown in dotted lines in Fig. 2, said coiled spring 38 will also act as a holding means for said parts.

The invention having been set forth, what is claimed as new and useful is:—

1. In a cultivator, a frame having a supporting wheel for its forward end and provided with rearwardly extending forks, a rod connecting the rear ends of said forks, shovel blades having their upper ends mounted on said rod, the upper ends of the shovel blades having laterally and inwardly extending lugs to overlie and abut the upper edges of the forks to brace the shovel blades in their vertical positions.

2. In a cultivator, a frame having rearwardly extending forks, a rod extending through and connecting the terminals of said forks, a tubular member on said rod between the terminals of the forks, shovel blades having their upper ends mounted upon said rod, means on the rod for clamping said parts together, the upper ends of the shovel blades having laterally and inwardly extending lugs overlying and abutting the upper edges of said forks for holding the shovel blades in vertical positions.

3. In a cultivator, a frame having rearwardly extending forks, a connection connecting the rear terminals of the forks, a standard having a cultivator at its lower end pivotally mounted between the forks, an upwardly and rearwardly extending brace pivotally carried by the standard and having a notch engaging said connection, and a spring for holding the brace in position and the notch engaging said connection.

4. In a wheel cultivator, a frame having rearwardly extending forks, a cross connection connecting the rear terminals of the forks, a rod passing through said forks, a tubular member on said rod, a standard provided with upwardly extending forks pivoted on said rod and having a shovel at its lower end, means for holding the rod in place, an upwardly and rearwardly extending brace pivoted in the crotch between the forks of the standard and having a notch near its upper rear end to receive and engage said cross connection, and a spring coöperating with the brace to hold the notch engaging said cross connection.

In testimony whereof I have signed my name to this specification in the presence of two subscribing witnesses.

NOAH EVERETT NICHOLS.

Witneseses:
CARL ROOK,
J. H. NATHO.

Copies of this patent may be obtained for five cents each, by addressing the "Commissioner of Patents, Washington, D. C."